US012780991B2

(12) United States Patent
Negishi

(10) Patent No.: US 12,780,991 B2
(45) Date of Patent: Nov. 3, 2026

(54) CONDENSATION-CURABLE SILICONE COMPOSITION, A CURED PRODUCT, AND A METHOD FOR PREPARING THE CURED PRODUCT

(71) Applicant: Shin-Etsu Chemical Co., Ltd., Tokyo (JP)

(72) Inventor: Kazuyuki Negishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 659 days.

(21) Appl. No.: 18/262,066

(22) PCT Filed: Jan. 21, 2022

(86) PCT No.: PCT/JP2022/002142

§ 371 (c)(1),
(2) Date: Jul. 19, 2023

(87) PCT Pub. No.: WO2022/163515

PCT Pub. Date: Aug. 4, 2022

(65) Prior Publication Data

US 2024/0092976 A1 Mar. 21, 2024

(30) Foreign Application Priority Data

Jan. 26, 2021 (JP) ................................ 2021-010056

(51) Int. Cl.

*C08G 77/08* (2006.01)
*C08G 77/18* (2006.01)
*C08K 5/31* (2006.01)
*C08K 5/3445* (2006.01)
*C08K 5/3462* (2006.01)

(52) U.S. Cl.

CPC ............ *C08G 77/08* (2013.01); *C08G 77/18* (2013.01); *C08K 5/31* (2013.01); *C08K 5/3445* (2013.01); *C08K 5/3462* (2013.01)

(58) Field of Classification Search

CPC ...... C08G 77/08; C08G 77/18; C08G 77/045; C08K 5/31; C08K 5/3445; C08K 5/3462; C08K 5/3442; C09D 183/04; C08L 83/06

See application file for complete search history.

(56) References Cited

U.S. PATENT DOCUMENTS

2011/0098392 A1 4/2011 Barrandon et al.
2013/0253134 A1* 9/2013 Maliverney ............ C08G 77/08 528/21
2017/0121625 A1 5/2017 Qian
2019/0177542 A1 6/2019 Uta et al.
2020/0320103 A1 10/2020 Fiszman et al.

FOREIGN PATENT DOCUMENTS

JP H0478865 A 3/1992
JP H10120678 A 5/1998
JP 2013224439 A 10/2013
JP 2018532025 A 11/2018
JP 2019070164 A 5/2019
WO 2018037682 A1 3/2018
WO 2018186167 A1 10/2018

OTHER PUBLICATIONS

English translation of International Search Report corresponding to International Patent Application No. PCT/JP2022/002142 (2 pages) (mailed Apr. 12, 2022).

* cited by examiner

*Primary Examiner* — Doris L Lee
(74) *Attorney, Agent, or Firm* — Myers Bigel, P.A.

(57) ABSTRACT

[Purpose] A purpose of the present invention is to provide a condensation-curable silicone composition having a curing property and storage stability.
[Solution] The present invention provides a condensation-curable silicone composition comprising organopolysiloxane having an alkoxysilyl group and a compound represented by the following general formula (1):

(1)

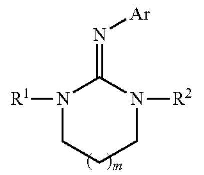

wherein $R^1$ and $R^2$ are, independently of each other, a hydrogen atom or an unsubstituted or substituted, monovalent hydrocarbon group having 1 to 12 carbon atoms, Ar is an unsubstituted or substituted aryl group having 6 to 20 carbon atoms or a heteroaryl group having 3 to 20 carbon atoms, and m is an integer of 0 to 3.
Further, the present invention provides a method for preparing a silicone cured product that includes a step of subjecting the organopolysiloxane having an alkoxysilyl group to hydrolytic condensation in the presence of the compound represented by the afore-mentioned general formula (1) to obtain the silicone cured product.

20 Claims, No Drawings

CONDENSATION-CURABLE SILICONE COMPOSITION, A CURED PRODUCT, AND A METHOD FOR PREPARING THE CURED PRODUCT

TECHNICAL FIELD

The present invention relates to a condensation-curable silicone composition, a cured product of the composition, and a method for preparing the cured product, and more specifically relates to a condensation-curable silicone composition comprising a specific guanidine compound as a condensation catalyst.

BACKGROUND ART

Since silicone resin is excellent in properties such as water repellency, heat resistance, weather resistance, cold resistance, electrical insulation, chemical resistance, safety for a human body, and the like, it is currently being widely used in various fields.

In particular, an organopolysiloxane having a three-dimensional crosslinking structure mainly comprising an $SiO_2$ unit (Q unit) and an $RSiO_{1.5}$ unit (T unit), wherein R is an organic group, such as an alkyl group, a phenyl group, or the like, is referred to as silicone resin and silicone alkoxy oligomer. In utilizing a curing property thereof, the organopolysiloxane is widely used in coating materials, coating agent applications, binder applications, and the like.

Among them, a liquid silicone oligomer having an alkoxysilyl group as a cross-linkable group is used as a main agent of a combustible solventless coating material not comprising any organic solvents harmful to a human body.

Additionally, the alkoxysilyl group promotes a cross-linking reaction even at normal temperature due to humidity in the air. Therefore, since the silicone oligomer containing the alkoxysilyl group forms a siloxane network by combining a curing catalyst to react with the alkoxysilyl group at normal temperature or under a heating condition, a coating film having excellent heat resistance and weather resistance may be easily formed, and thus, the silicone oligomer is used in a wide range of fields, from outdoor structures to electronic components.[0004]

While a metal catalyst such as aluminum, titanium, zinc, bismuth, or tin is generally used as the curing catalyst of the silicone oligomer containing the alkoxysilyl group, a guanidine-based catalyst or an amine-based catalyst has recently been considered as an environmentally-friendly metal-free catalyst (Patent Literature 1).

PRIOR LITERATURES

Patent Literature 1: WO 2018/186167

DISCLOSURE OF THE INVENTION

Problems to be Solved by the Invention

Examination by the inventors has revealed that when the afore-mentioned amine catalyst or guanidine catalyst is used in the condensation-curable silicone composition, a strong basicity thereof causes a siloxane chain to be cut, and a pot life of the silicone composition significantly deteriorates in some cases. The present invention has been made in consideration of the afore-mentioned circumstances, and a purpose of the present invention is to provide a condensation-curable silicone composition having a curing property and storage stability.

Solutions to the Problems

The present inventors have made research to solve the aforementioned problems and found that by using a cyclic aryl guanidine compound having the specific structure described below as a condensation catalyst, a condensation-curable silicone composition having both a curing property and storage stability is obtained, leading them to achieve the present invention.[008]

That is, the present invention provides a condensation-curable silicone composition comprising organopolysiloxane having an alkoxysilyl group and a compound represented by the following general formula (1):

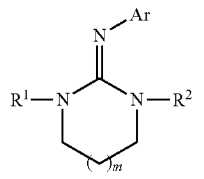

(1)

wherein $R^1$ and $R^2$ are, independently of each other, a hydrogen atom or an unsubstituted or substituted, monovalent hydrocarbon group having 1 to 12 carbon atoms, Ar is an unsubstituted or substituted aryl group having 6 to 20 carbon atoms or a heteroaryl group having 3 to 20 carbon atoms, and m is an integer of 0 to 3.

Further, the present invention provides a method for preparing a silicone cured product that comprises a step of subjecting the organopolysiloxane having an alkoxysilyl group to hydrolytic condensation in the presence of the compound represented by the afore-mentioned general formula (1) to obtain a silicone cured product.

Effects of the Invention

The condensation-curable silicone composition of the present invention comprises the cyclic aryl guanidine compound represented by the afore-mentioned general formula (1) as the condensation catalyst and, thereby, provides a cured product having excellent storage stability and high hardness. Therefore, the condensation-curable silicone composition is suitably used as a coating agent suitable for the environment in which an amount of a metal catalyst is reduced, or a metal catalyst is not used.

DESCRIPTION OF PREFERRED EMBODIMENTS

The present invention will be described in further detail below.

A condensation-curable silicone composition of the present invention comprises organopolysiloxane having an alkoxysilyl group and a compound represented by the following general formula (1), hereinafter referred to as a cyclic aryl guanidine compound or a guanidine compound.

In the composition of the present invention, the following cyclic aryl guanidine compound functions as a curing catalyst of the condensation-curable silicone composition.

(1)

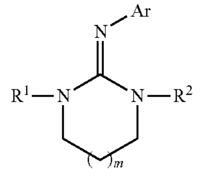

$R^1$ and $R^2$ are, independently of each other, a hydrogen atom or an unsubstituted or substituted, monovalent hydrocarbon group having 1 to 12 carbon atoms. The monovalent hydrocarbon group having 1 to 12 carbon atoms may have any of a linear, cyclic, or branched structure. More specifically, examples of the monovalent hydrocarbon group include methyl, ethyl, i-propyl, n-propyl, n-butyl, s-butyl, t-butyl, n-pentyl, n-hexyl, cyclohexyl, n-heptyl, n-octyl, n-nonyl and n-decyl groups; a methyl, ethyl, i-propyl, n-propyl, t-butyl, s-butyl, n-butyl group, allyl group or benzyl group is preferred; and a methyl or ethyl group is more preferred. Examples of the substituted monovalent hydrocarbon group having 1 to 12 carbon atoms include a methoxymethyl group, an ethoxymethyl group, a propoxymethyl group, a butoxymethyl group, a chloromethyl group, a chloroethyl group, a chloropropyl group, an aminopropyl group, a mercaptopropyl group, a trifluoromethyl group, a trifluoroethyl group, and a trifluoropropyl group.

m is an integer of 0 to 3, and preferably an integer of 0 to 2, more preferably 0 or 1, and particularly preferably 0. Note that when m=0, the compound has the structure represented by the following structure.

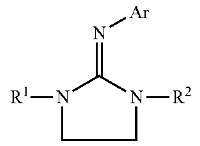

Ar is an unsubstituted or substituted aryl group having 6 to 20 carbon atoms or a heteroaryl group having 3 to 20 carbon atoms. Examples of the aryl group include a phenyl, naphthyl, anthracenyl, or pyrenyl group; and examples of the heteroaryl group include pyridyl, thienyl, indolyl, triazine, pyrazine and pyrimidine, pyridyl, thienyl and indolyl are preferred, and a pyridyl group is particularly preferred. Ar is preferably an unsubstituted or substituted aryl group having 6 to 16 carbon atoms or a heteroaryl group having 5 to 16 carbon atoms. More preferably, Ar is an unsubstituted or substituted aryl group having 6 to 12 carbon atoms or a pyridyl group, particularly preferably an unsubstituted or substituted phenyl group or a pyridyl group, and most preferably an unsubstituted or substituted phenyl group.

The aryl group or the heteroaryl group may have a substituent, and a substituent thereof is not particularly limited. Examples of the substituent include an alkyl group such as a methyl, ethyl, i-propyl, n-propyl, n-butyl, s-butyl, t-butyl, n-pentyl, n-hexyl, n-heptyl, n-octyl, n-nonyl, or n-decyl group; a cyclic alkyl group such as a cyclopropyl, cyclobutyl, cyclopentyl, cyclohexyl, cycloheptyl, cyclooctyl, cyclononyl, or cyclodecyl group; an alkenyl group such as a vinyl, allyl, butenyl, or pentenyl group; an aryl group such as a phenyl or naphthyl group; a halogeno group such as a fluoro, chloro, bromo, or iodine group; a nitrogen-containing substituent such as a nitro, cyano, amino, monoalkylamino, dialkylamino, or pyridyl group; an oxygen-containing substituent such as a methoxy, ethoxy, propoxy, butoxy, phenoxy, naphthoxy, furyl, or hydroxyl group; a sulfur-containing substituent such as a thiol, thioether, and thiophene group, and a halogen-containing substituent such as a trifluoroalkyl group.

Further, even when the alkoxysilyl group may be introduced into the Ar group via a linking chain to form a structure capable of forming a coupling with silicone, which does not prohibit the effects of the present invention. The number of substitutions of the substituents on the Ar group and coupled positions of the substituent are optional, and an optional substituent may be further provided on the aforementioned substituent.

The following compounds are exemplified as such a cyclic aryl guanidine compound.

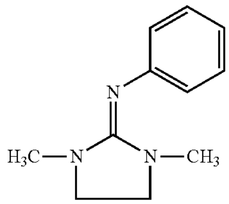

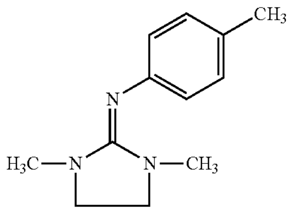

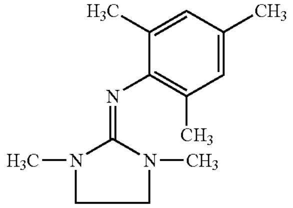

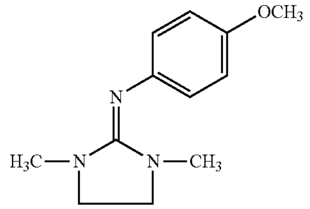

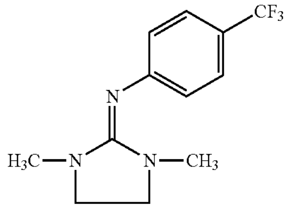

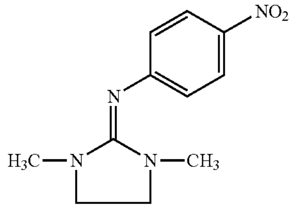

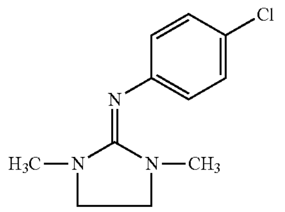

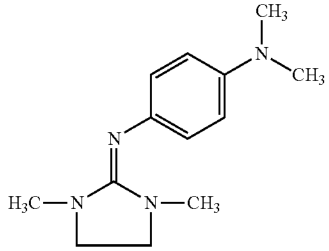

-continued

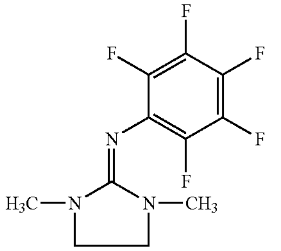

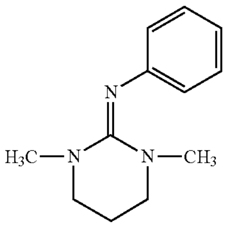
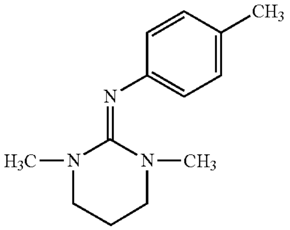

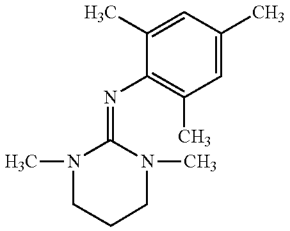

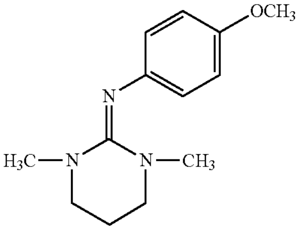

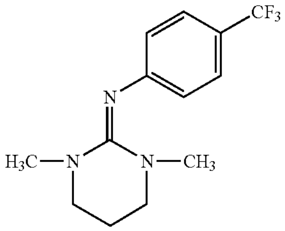
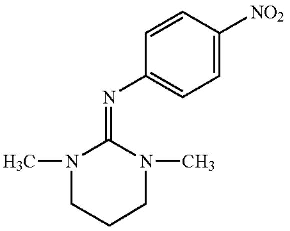

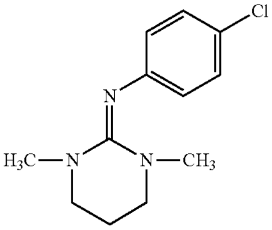

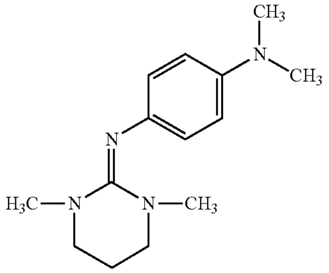

-continued

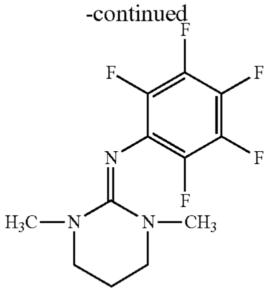

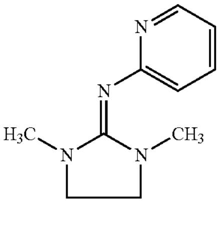
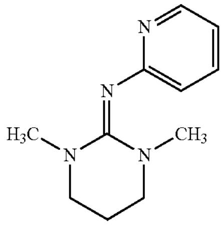

The afore-mentioned cyclic aryl guanidine compound may be prepared by reacting a urea derivative represented by the following structural formula (1a) with a chlorinating agent to synthesize Vilsmeier salt (1b), then reacting the resultant with primary arylamine represented by the following structural formula (1c).

(1a)

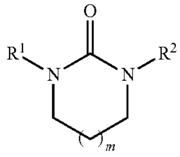

(1b)

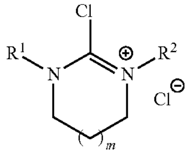

(1c)

$H_2N—Ar$

Examples of the chlorinating agent include oxalyl chloride, phosphoryl chloride, and thionyl chloride. From the viewpoint of reactivity, oxalyl chloride and phosphoryl chloride are preferred, and oxalyl chloride is particularly preferred. To synthesize the Vilsmeier salt, 1 to 5 equivalents, preferably 1 to 3 equivalents, and more preferably 1 to 1.5 equivalent of the chlorinating agent, per mole of the urea derivative, is added and these are preferably reacted at a temperature of 0 to 100 °C for 1 to 48 hours.

When the Vilsmeier salt (1b) is reacted with an aniline derivative (1c), 0.5 to 5 equivalents, preferably 0.7 to 3 equivalents, more preferably 0.8 to 1.5 equivalent of the aniline derivative (1c) is added to per mole of the Vilsmeier salt (1b), and these are preferably reacted at a temperature of 0 to 100 °C for 1 to 24 hours.

The afore-mentioned cyclic aryl guanidine compound may be synthesized in the presence of an organic solvent. As long as the organic solvent is compatible with each of the afore-mentioned raw material compounds and does not react with the Vilsmeier salt, the organic solvent is not particularly limited. Examples of the organic solvent include aromatic hydrocarbons such as toluene and xylene, hydrocarbons such as hexane and octane, ketones such as methyl ethyl ketone and methyl isobutyl ketone, and esters such as ethyl acetate and isobutyl acetate.

When the organic solvent is used, a usage amount thereof is not particularly limited. It is generally preferably 20 parts by mass or less, more preferably 0.5 to 10 parts by mass, and further preferably 1 to 5 parts by mass, relative to one part by mass of a total mass of the raw material compounds.

N,N'-dimethyl imidazolidinone, N,N'-diethyl imidazolidinone, N,N'-di(methoxymethyl)imidazolidinone, N,N'-dipropyl imidazolidinone, N-methyl N'-ethyl imidazolidinone, N,N'-dimethyl propylene urea, N,N'-diethyl propylene urea, N,N'-dipropylpropylene urea, and N-methyl N'-ethylpropylene urea are preferred as the urea derivative (1a). N,N'-diethyl imidazolidinone and N,N'-dimethyl propylene urea are preferred in consideration of ease of acquiring the raw material.

Examples of the primary arylamine (1c) include aniline, anisidine, phenoxyaniline, hydroxyaniline, (hydroxymethyl) aniline, mesitylamine, xylylamine, trifluoromethylaniline, N,N'-dimethylaminoaniline, nitroaniline, cyanoaniline, toluidine, ethylaniline, dimethylaniline, diethylaniline, benzylaniline, chloroaniline, fluoroaniline, bromoaniline, iodoaniline, hexafluoroaniline, vinylaniline, ethynylaniline, aminobenzenethiol, aminopyridine, aminothiophene, aminopyrrole, and aminofuran. Aniline, anisidine, toluidine, and mesitylamine are preferred in consideration of ease of acquiring the raw material.

The afore-mentioned cyclic guanidine compound functions as the curing catalyst in the condensation-curable silicone composition comprising the organopolysiloxane having the alkoxysilyl group. Hydrolytic condensation curing is carried out on the organopolysiloxane having the alkoxysilyl group in the presence of the cyclic guanidine compound. In particular, the hydrolytic condensation may be carried out in the presence of humidity in the air.

While an additive amount of the guanidine compound is not particularly limited. The amount may be adjusted to provide a curing speed to be in an appropriate range to prepare a cured coating film having the desired physical properties, and adjusted in consideration of improving work efficiency during application, further economic efficiency, and the like. The amount of the guanidine compound is preferably 0.1 to 15 parts by mass, more preferably 0.5 to 10 parts by mass, and further preferably 1 to 5 parts by mass, relative to 100 parts by mass of the organopolysiloxane having the alkoxysilyl group.

An oligomer having an alkoxysilyl group at the end may be used as the organopolysiloxane having the alkoxysilyl group. The organopolysiloxane may be a polymer having a linear, cyclic, or branched siloxane structure, and preferably is an organopolysiloxane having a cyclic structure from the viewpoint of crack resistance.

As long as the organopolysiloxane having the alkoxysilyl group has one or more alkoxysilyl groups in one molecule, the organopolysiloxane is not particularly limited. An organopolysiloxane having two or more alkoxysilyl groups in one molecule is preferred in consideration of forming a coating film having further hardness.

While a kinematic viscosity of the organopolysiloxane having the alkoxysilyl group is not particularly limited, 10 to 10,000 $mm^2/s$ is preferred, 10 to 1,000 $mm^2/s$ is more preferred, and from the viewpoint of work efficiency, 10 to 200 $mm^2/s$ is particularly preferred. The kinematic viscosity is a value measured at 25 °C by an Ostwald viscometer.

The organopolysiloxane having the cyclic structure is preferably one or more type selected from cyclic alkoxysiloxane represented by the following general formula (2) and a hydrolysis condensate thereof.

(2)

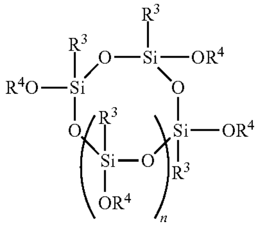

wherein $R^3$ is, independently of each other, an unsubstituted or substituted monovalent hydrocarbon group having 1 to 8 carbon atoms, $R^4$ is, independently of each other, an unsubstituted or substituted monovalent hydrocarbon group having 1 to 3 carbon atoms, and n is an integer of 1 to 3.

Examples of the monovalent hydrocarbon group having 1 to 8 carbon atoms, which is $R^3$, include a methyl, ethyl, i-propyl, n-propyl, n-butyl, s-butyl, t-butyl, n-pentyl, n-hexyl, n-heptyl, n-octyl, cyclohexyl, phenyl, naphthyl, or vinyl group; and a methyl, ethyl, or phenyl group is preferred. The substituted monovalent hydrocarbon group having 1 to 8 carbon atoms include an (epoxycyclohexyl)ethyl group, a glycidoxypropyl group, a methacryloxypropyl group, an aciyloxypropyl group, an aminopropyl group, a mercaptopropyl group, a chloromethyl group, a chloroethyl group, a chloropropyl group, a chlorobutyl group, a chloropentyl group, a chlorohexyl group, a trifluoromethyl group, a trifluoroethyl group, and a trifluoropropyl group.

Examples of the monovalent hydrocarbon group having 1 to 3 carbon atoms, which is $R^4$, include a methyl, ethyl, i-propyl, or n-propyl group; and a methyl or ethyl group is preferred. The substituted monovalent hydrocarbon group having 1 to 3 carbon atoms includes a chloromethyl group, a chloroethyl group, a chloropropyl group, a trifluoromethyl group, a trifluoroethyl group, a trifluoropropyl group, an acetoxy group, and a propionyloxy group.

Examples of such a cyclic alkoxysiloxane preferably include the followings.

(2A)

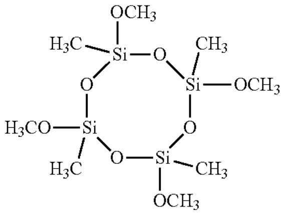

(2B)

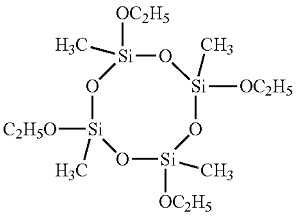

-continued (2C)

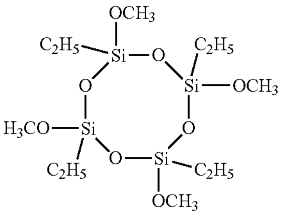

(2D)

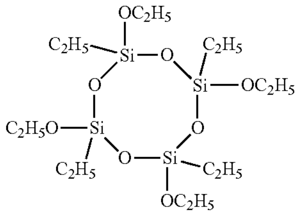

(2E)

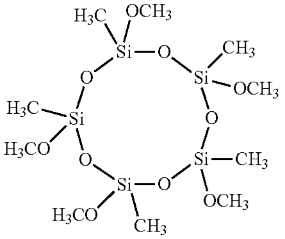

(2F)

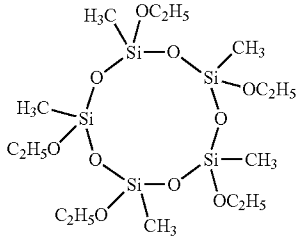

(2G)

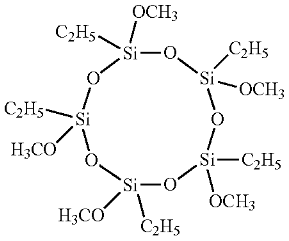

(2H)

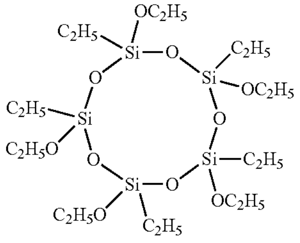

The organopolysiloxane having the alkoxysilyl group may be a partial hydrolysis condensate of alkoxysilane.

Alkoxysilanes having 1 to 4, preferably 2 or 3 alkoxy groups having 1 to 6 carbon atoms, preferably 1 to 4 carbon atoms, are preferred as the alkoxysilane. Examples of the alkoxysilane include dimethyldimethoxysilane, dimethyldiethoxysilane, dimethyl diisopropoxysilane, dimethyldibutoxysilane, dimethyldiisopropenoxysilane, propylmethyldimethoxysilane, hexylmethyldimethoxysilane, phenylmethyldimethoxysilane, diphenyldimethoxysilane, methyltrimethoxysilane, methyltriethoxysilane, methyltriisopropoxysilane, methyltributoxysilane, methyltriisopropenoxysilane, ethyltrimethoxysilane, ethyltriethoxysilane, butyltrimethoxysilane, hexyltrimethoxysilane, decyltrimethoxysilane, phenyltrimethoxysilane, cyclohexyltrimethoxysilane, tetramethoxysilane and tetraethoxysilane.

Further, other alkoxysilane having a reactive functional group may be used, such as vinylmethyldimethoxysilane, vinylmethyldiethoxysilane, 3-glycidoxypropylmethyldimethoxysilane, 3-glycidoxypropylmethyldiethoxysilane, 3-(meth)acryloxypropylmethyldimethoxysilane, 3-(meth)acryloxypropylmethyldiethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, vinyltrimethoxysilane, vinyltriethoxysilane, 5-hexenyltrimethoxysilane, 3-glycidoxypropyltrimethoxysilane, 3-glycidoxypropyltriethoxysilane, 3-(meth)acryloxypropyltrimethoxysilane, 3-(meth)acryloxypropyltriethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-(2-aminoethyl)aminopropyltrimethoxysilane, 3-mercaptopropyltrimethoxysilane and 3-mercaptopropyltriethoxysilane.

Among these, methoxysilane and ethoxysilane are preferred as the alkoxysilane from the aspect of ease of volatilization of a by-product, and methyltrimethoxysilane and dimethyldimethoxysilane are preferred from the aspect of high reactivity.

The afore-mentioned alkoxysilane and the cyclic alkoxysiloxane represented by the afore-mentioned formula (2) may be subjected to a hydrolytic condensation to prepare the organopolysiloxane having the alkoxysilyl group. The use of an acid catalyst is preferred for the hydrolytic condensation of the cyclic alkoxysiloxane. Any acid catalyst having enough acidity to make the alkoxysilyl group hydrolyze and dehydration condensate on the generated silanol forming siloxane coupling may be used, and is not particularly limited. An acid catalyst with a pKa in a range of −2.9 to 0 is preferred, and a sulfonic acid-based catalyst with a pKa in a range of −2.9 to 0 is particularly preferred.

The acid catalyst may be any form of liquid, solid, and gas, and the form is not particularly limited. Examples of the acid catalyst include substituted or unsubstituted alkyl sulphonic acid having 1 to 14 carbon atoms, a substituted or unsubstituted benzenesulfonic acid having 6 to 30 carbon atoms and a hydrate thereof, a substituted or unsubstituted naphthalenesulfonic acid having 6 to 30 carbon atoms and a hydrate thereof, a substituted or unsubstituted camphor sulfonic acid, a sulfo group-containing solid acid, and a nitric acid. Among these, methanesulfonic acid, ethanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), and dodecylbenzenesulfonic acid (DDBSA) are preferred; and methanesulfonic acid, paratoluenesulfonic acid, benzenesulfonic acid, dinonylnaphthalenedisulfonic acid (DNNDSA), dinonylnaphthalene(mono)sulfonic acid (DNNSA), and dodecylbenzenesulfonic acid (DDBSA) are particularly preferred. Generally, the amount of the acid catalyst is preferably 0.001 to 10 mass %, more preferably 0.01 to 5 mass %, and particularly preferably 0.1 to 2.5 mass %, based on a total mass of a polymerization reaction system.

While the hydrolytic condensation reaction may be carried out solventless, an organic solvent, such as methanol, ethanol, isopropyl alcohol, butanol, diacetone alcohol, propylene glycol monomethyl ether, propylene glycol monomethyl ether acetate, acetone, toluene, and xylene may be used. When the organic solvent is used, an amount of the organic solvent is not particularly limited, and 20 parts by mass or less is preferred, 0.25 to 10 parts by mass is more preferred, and 0.5 to 5 parts by mass is further preferred, relative to 1 part by mass of a total of silane and alkoxysiloxane.

An amount of water used for the reaction is generally preferably 0.025 to 5.0 moles, 0.05 to 2.5 moles are more preferred, and 0.075 to 1.0 moles are further preferred, relative to 1 mole of the alkoxysilyl group in the reaction system.

While the reaction temperature is not particularly limited, it is generally 0 to 150 °C, preferably 20 to 120 °C, more preferably 40 to 100 °C, and further preferably 50 to 80 °C. The reaction time is generally 1 hour or more, and preferably 2 to 72 hours.

An alcohol byproduct produced in the hydrolytic condensation reaction of the alkoxysilyl group, an unreacted raw material and a low molecular siloxane are preferably removed by a distillation operation, and a temperature and a pressure therefor may be conditions under which these impurities may be removed and not particularly limited. The temperature is generally 10 to 150 °C and preferably 60 to 120 °C, and the operation may be carried out under atmospheric pressure or decompression.

An optional additive may be added as appropriate to the condensation-curable silicone composition of the present invention to the extent that the effects of the invention are not inhibited.

Examples of such an additive include a solvent, a non-reactive silicone oil, a reactive silicone oil, an adhesion promoter such as a silane coupling agent, an anti-aging agent, a rust inhibitor, a colorant, a surfactant, a rheology modifier, an ultraviolet absorber, an infrared absorber, a fluorescent agent, an abrasive, a fragrance, a filler, a leveling agent, a reactive diluent, a non-reactive polymer resin, an antioxidant, an ultraviolet absorber, a light stabilizer, an antifoaming agent, a dispersant, an antistatic agent, and a thixotropy imparting agent.

In addition, a metal-based curing catalyst may be combined to compensate for catalytic activity of the guanidine compound. Examples of the metal-based curing catalyst include an alkyl tin compound such as dibutyltin oxide and dioctyl tin oxide, an alkyl tin ester compound such as dibutyltin diacetate, dibutyltin dilaurate, dioctyl tin dilaurate, dibutyltin dioctoate, dioctyltin dioctoate, and dioctyltin diversatate, a titanate ester such as tetraisopropoxytitanium, tetra-n-butoxytitanium, tetrakis(2-ethylhexoxy)titanium, tetra-t-butoxytitanium, dipropoxybis(acetylacetonato)titanium, titanium diisopropoxybis(ethylacetoacetate), and titanium isopropoxy octylene glycol, a titanium chelate compound, and partial hydrolysates thereof, and an aluminum compound such as zinc naphthenate, zinc stearate, zinc-2-ethyloctoate, iron-2-ethylhexoate, cobalt-2-ethylhexoate, manganese-2-ethylhexoate, cobalt naphthenate, acetylacetone aluminum, aluminum bis(ethylacetoacetate)mononormal butyrate, aluminum ethyl acetoacetate di-normal butyrate, aluminum tris(ethylacetoacetate), and hydrolysates thereof, and among these, tetraisopropoxytitanium, tetra-n-butoxytitanium, tetrakis(2-ethylhexoxy)titanium, tetra-t-butoxytitanium, dipropoxybis(acetylacetonato)titanium, titanium diisopropoxybis(ethylacetoacetate), tetra(acetylacetonato)titanium, tetra(ethylacetoacetate)titanium, tetra(methylacetoacetate)titanium, tetra(diethylmalonate)titanium, tetra(dimethylmalonate)titanium, and partial hydrolysates thereof are preferred in terms of catalytic activity. When the metal-based curing catalyst is combined, an amount thereof may be 0.01 to 5 parts by mass, preferably 0.05 to 3 parts by mass, and particularly preferably 0.1 to 2 parts by mass, relative to 100 parts by mass of the condensation-curable silicone composition.

The condensation-curable silicone composition of the present invention is applied to a surface of a base material and cured to obtain an article having a coating layer made of the cured product. An application method is not particularly limited. For example, the method to be used may be selected from the known methods as appropriate, such as spray coating, spin coating, dip coating, roller coating, brush application, bar coating, and flow coating.

Examples of the base material include acrylic-based resin such as epoxy resin, phenolic resin, polycarbonates and a polycarbonate blend, and poly(methyl methacrylate); polyester resin such as poly(ethylene terephthalate), poly(butylene terephthalate), and unsaturated polyester resin; an organic polymer base material such as polyamide resin, polyimide resin, an acrylonitrile-styrene copolymer, a styrene-acrylonitrile-butadiene copolymer, polyvinyl chloride resin, polystyrene resin, a polystyrene and polyphenylene ether blend, cellulose acetate butyrate, and polyethylene resin; a metal base material such as a steel plate; a coated application surface, glass, ceramic, concrete, a slate plate, a textile, wood, a stone material, a roof tile; an inorganic filler such as (hollow) silica, titania, zirconia, and alumina; and a glass fiber product such as glass fiber, glass cloth, glass tape, a glass mat, and glass paper. While a material and a shape of the base material are not particularly limited, the curable composition of the present invention may be particularly suitably used for a steel plate and coating of a glass.

The condensation-curable silicone composition of the present invention comes in contact with water content in the atmosphere to thereby promote the hydrolytic condensation reaction of the organopolysiloxane having the alkoxysilyl group and start a curing reaction. An index of the water content in the atmosphere may be an optional humidity of 10 to 100% RH, and the humidity in air is sufficient. In general, since the higher the humidity is, the faster the hydrolysis advances, the water content may be added in the atmosphere as desired, and water may be added in the composition. A curing reaction temperature and time may be set as appropriate in accordance with factors such as the base material used, a water content, a concentration of a catalyst, and a type of hydrolyzable group. A curing temperature is preferably −10 to 200 °C, while 0 to 150 °C is particularly preferred, and a heating process may be carried out within a range not exceeding a heat-resistant temperature of the base material. A curing time is generally around one minute to one week in a range not exceeding the heat-resistant temperature of the base material used. In the condensation-curable silicone composition of the present invention, curing proceeds even at normal temperature to provide a coating film having excellent hardness. In addition, when the humidity is increased, the curable property tends to improve. In comparison with a composition comprising the conventional amine catalyst or guanidine-based catalyst, the condensation-curable silicone composition of the present invention has excellent stability at room temperature.

EXAMPLES

Examples and Comparative Examples are given below for describing the present invention in more detail, but the present invention is not limited to the following examples.

In the following, the kinematic viscosity is a value measured at 25 °C by an Ostwald viscometer.

[1] Preparation of Organopolysiloxane Having the Alkoxysilyl Group

Synthesis Example 1-1

In accordance with the procedure of Paragraph 0104, Example 26, disclosed in WO 2007/140012, a cyclic alkoxysiloxane (2,4,6,8-tetra methoxy-2,4,6,8-tetramethylcyclotetrasiloxane) represented by the following structural formula (2A) (organopolysiloxane 1) was obtained.

(2A)

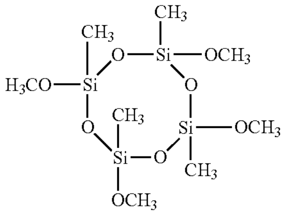

Synthesis Example 1-2

In a 1,000 mL separable flask equipped a stirrer, a reflux condenser, a dropping funnel and a thermometer, were put 361 g of the cyclic alkoxysiloxane represented by the afore-mentioned formula (2A) obtained in Synthesis Example 1 and 361 g of toluene, to which 3.6 g of methanesulfonic acid was added while stirring. Then, 13.5 g of ion exchanged water was subsequently dropped over one hour. After dropping was complete, the resultant was polymerized at 25 °C for two hours. 18.0 g of KYOWAAD 500SN (ex Kyowa Chemical Industry Co., Ltd.) was added to the obtained liquid, the resultant was stirred at 25 °C for two hours to be neutralized and, then, the remaining methanol and a low molecular component were removed by vacuum distillation to obtain a hydrolysis condensate of the afore-mentioned cyclic alkoxysiloxane (organopolysiloxane 2).

The kinematic viscosity of the obtained organopolysiloxane 2 was 49 $mm^2/s$.

Synthesis Example 1-3

In a 1,000 mL separable flask equipped a stirrer, a reflux condenser, a dropping funnel, and a thermometer, were put 289 g of the cyclic alkoxysiloxane represented by the afore-mentioned formula (2A) obtained in Synthesis Example 1, 96 g of dimethyldimethoxysilane and 385 g of toluene, to which 4.0 g of methanesulfonic acid was added while stirring and, then, 13.0 g of ion exchanged water was subsequently dropped over one hour. After dropping was complete, the resultant was polymerized at 25 °C for two hours. 20.0 g of KYOWAAD 500SN (ex Kyowa Chemical Industry Co., Ltd.) was added to the obtained liquid, the resultant was stirred at 25 °C for two hours to be neutralized and, then, the remaining methanol and a low molecular component were removed by vacuum distillation to obtain a hydrolysis condensate of the afore-mentioned cyclic alkoxysiloxane and the dimethyldimethoxysilane (organopolysiloxane 3).

The kinematic viscosity of the obtained organopolysiloxane 3 was 31 $mm^2/s$.

[2] Preparation of the Guanidine Compound

Synthesis Example 2-1

In a 100 mL separable flask equipped a stirrer, a reflux condenser, a dropping funnel, and a thermometer, were put 14.0 g of oxalyl chloride, 11.4 g of dimethyl imidazolidinone, and 28 g of toluene and reacted at room temperature for 12 hours under nitrogen stream. 9.3 g of aniline and 20.0 g of triethylamine were added to the obtained liquid, and the resultant was reacted at room temperature for two hours under nitrogen stream. 100 g of water was added to the reaction solution, 1 N of hydrochloric acid was added to the water layer to bring the pH to 7, and the water layer was washed with toluene. Then, in a state where 1 N of a sodium hydroxide aqueous solution was added to the water layer to make it the pH to 14, an object was extracted with toluene, and the toluene was removed by vacuum distillation to obtain a guanidine compound 1 represented by the following formula (3a).

(3a)

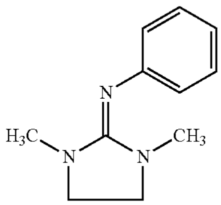

Synthesis Example 2-2

Synthesis Example 2-1 was repeated, except that 12.3 g of anisidine was used instead of aniline in Synthesis Example 2-1 to obtain a guanidine compound 2 represented by the following formula (3b).

(3b)

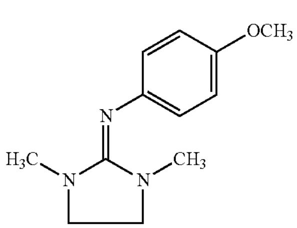

Synthesis Example 2-3

Synthesis Example 2-1 was repeated, except that 9.4 g of 2-aminopyridine was used instead of aniline in Synthesis Example 2-1 to obtain a guanidine compound 3 represented by the following formula (3c).

(3c)

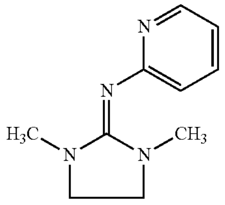

Synthesis Example 2-4

Synthesis Example 2-1 was repeated, except that 13.5 g of mesitylamine was used instead of aniline in Synthesis Example 2-1 to obtain a guanidine compound 4 represented by the following formula (3d).

(3d)

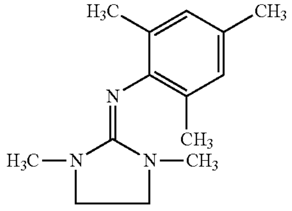

Synthesis Example 2-5

Synthesis Example 2-1 was repeated, except that 17.1 g of dimethyl propylene urea was used instead of dimethyl imidazolidinone in Synthesis Example 2-1 to obtain a guanidine compound 5 represented by the following formula (3e).

(3e)

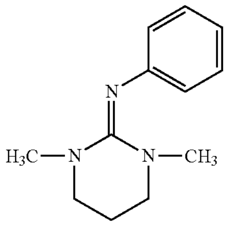

Comparative Synthesis Example 2-6

Synthesis Example 2-1 was repeated, except that 12.7 g of tetramethyl urea was used instead of dimethyl imidazolidinone in Synthesis Example 2-1 to obtain a guanidine compound 6 represented by the following formula (3f).

(3f)

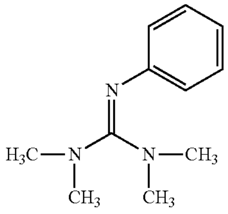

[3] Preparation of the Condensation-Curable Silicone Composition

Examples 1 to 7 and Comparative Examples 1 to 4

100 parts by mass of the organopolysiloxane obtained in the afore-mentioned Synthesis Examples 1-1 to 1-3 and the guanidine compounds obtained in the afore-mentioned Synthesis Examples 2-1 to 2-6 or the condensation catalyst in the following Table 1 in the composition amounts described in the following Table 1 were uniformly mixed with a stirrer to prepare the condensation-curable silicone composition. 0.2 g of the obtained condensation-curable silicone composition (that is, a coating agent) was applied to a glass plate using a bar coater No. 5 under air of 50% RH at 25 °C, and the composition was cured under the atmosphere of 50% RH at 25 °C for seven days.

A pencil hardness of the obtained cured product and a storage stability of the condensation-curable silicone composition were measured and evaluated in accordance with the followings.

Pencil Hardness

The pencil hardness of the coating film having a thickness of 10 μm after the afore-mentioned curing was determined with applying a load of 750 g by a method according to the pencil scratch test described in JIS K 5600-5-4.

Storage Stability

After 10 g of the afore-mentioned condensation-curable silicone composition was stored hermetically sealed in a glass bottle at 80 °C for 24 days, a presence/absence of gelation was visually confirmed. Samples in which gelation did not occur were evaluated as good (G), and gelatinized samples were evaluated as poor (P). The results were shown in Table 1.

TABLE 1

| | | Example | | | | | | | | | Comparative Example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| | Organopolysiloxane 1 | 100 | | | 100 | 100 | 100 | 100 | 100 | 100 | 100 | 100 | 100 | 100 |
| | Organopolysiloxane 2 | | 100 | | | | | | | | | | | |
| | Organopolysiloxane 3 | | | 100 | | | | | | | | | | |
| Condensation catalyst | Guanidine compound 1 | 5 | 5 | 5 | 0.5 | 10 | | | | | | | | |
| | Guanidine compound 2 | | | | | | 5 | | | | | | | |
| | Guanidine compound 3 | | | | | | | 5 | | | | | | |
| | Guanidine compound 4 | | | | | | | | 5 | | | | | |

TABLE 1-continued

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Guanidine compound 5 | | | | | | | | | 5 | | | | |
| DBU | | | | | | | | | | 5 | | | |
| Tetramethylguanidylpropyl trimethoxysilane | | | | | | | | | | | 5 | | |
| 3-aminopropyltrimethoxysilane | | | | | | | | | | | | 5 | |
| Guanidine compound 6 | | | | | | | | | | | | | 5 |
| Pencil Hardness | 4H | 4H | 4H | 3H | 4H | 4H | 4H | 4H | 4H | 4H | 4H | 4H | 4H |
| Storage Stability | G | G | G | G | G | G | G | G | G | P | P | P | P |

As shown in Table 1, the condensation-curable silicone compositions of Examples 1 to 9 have satisfactory storage stability and provide a coating film with a high hardness. In contrast, the condensation-curable silicone composition comprising amidine, guanidine not having the cyclic structure, or the amine catalyst, such as in Comparative Examples 1 to 4, gelatinized over time and had poor storage stability.

INDUSTRIAL APPLICABILITY

The condensation-curable silicone composition of the present invention comprising the cyclic aryl guanidine compound as the condensation catalyst has excellent storage stability and provides a cured product having high hardness. Consequently, the condensation-curable silicone composition is suitably used as an environmentally conscious coating agent in which an amount of a metal catalyst is reduced, or a metal catalyst is not used.

The invention claimed is:

1. A condensation-curable silicone composition comprising an organopolysiloxane having an alkoxysilyl group and a compound represented by the following general formula (1):

(1)

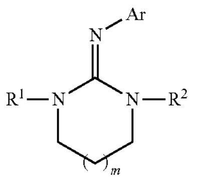

wherein $R^1$ and $R^2$ are, independently of each other, a hydrogen atom or an unsubstituted or substituted, monovalent hydrocarbon group having 1 to 12 carbon atoms, Ar is an unsubstituted or substituted aryl group having 6 to 20 carbon atoms or a heteroaryl group having 3 to 20 carbon atoms, and m is an integer of 0 to 3.

2. The condensation-curable silicone composition according to claim 1, wherein Ar in the general formula (1) is a substituted or unsubstituted, phenyl group or pyridyl group.

3. The condensation-curable silicone composition according to claim 2, wherein Ar is a phenyl group, or a phenyl group whose at least one hydrogen atom bonded to the carbon atom is substituted with an alkyl group, a cyclic alkyl group, an alkenyl group, an aryl group, a halogen atom, a nitrogen-containing substituent, an oxygen-containing substituent, a sulfur-containing substituent or a group substituted with a halogen-containing substituent, or a pyridyl group.

4. The condensation-curable silicone composition according to claim 1, wherein an amount of the compound represented by the general formula (1) is 0.1 to 15 parts by mass, relative to 100 parts by mass of the organopolysiloxane having the alkoxysilyl group.

5. The condensation-curable silicone composition according to claim 4, wherein Ar in the general formula (1) is a substituted or unsubstituted, phenyl group or pyridyl group.

6. The condensation-curable silicone composition according to claim 5, wherein Ar is a phenyl group, or a phenyl group whose at least one hydrogen atom bonded to the carbon atom is substituted with an alkyl group, a cyclic alkyl group, an alkenyl group, an aryl group, a halogen atom, a nitrogen-containing substituent, an oxygen-containing substituent, a sulfur-containing substituent or a group substituted with a halogen-containing substituent, or a pyridyl group.

7. The condensation-curable silicone composition according to claim 1, wherein the organopolysiloxane having the alkoxysilyl group is one or more selected from the group consisting of a cyclic alkoxysiloxane represented by the following general formula (2), a hydrolysis condensate thereof and a hydrolysis condensate of the cyclic alkoxysiloxane represented by the following general formula (2) with an alkoxysiloxane, (2)

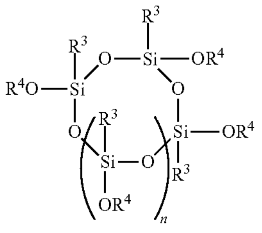

wherein $R^3$ is, independently of each other, an unsubstituted or substituted monovalent hydrocarbon group having 1 to 8 carbon atoms, $R^4$ is, independently of each other, an unsubstituted or substituted monovalent hydrocarbon group having 1 to 3 carbon atoms, and n is an integer of 1 to 3.

8. The condensation-curable silicone composition according to claim 7, wherein Ar in the general formula (1) is a substituted or unsubstituted, phenyl group or pyridyl group.

9. The condensation-curable silicone composition according to claim 8, wherein Ar is a phenyl group, or a phenyl group whose at least one hydrogen atom bonded to the carbon atom is substituted with an alkyl group, a cyclic alkyl group, an alkenyl group, an aryl group, a halogen atom, a nitrogen-containing substituent, an oxygen-containing substituent, a sulfur-containing substituent or a group substituted with a halogen-containing substituent, or a pyridyl group.

10. The condensation-curable silicone composition according to claim 7, wherein an amount of the compound represented by the general formula (1) is 0.1 to 15 parts by mass, relative to 100 parts by mass of the organopolysiloxane having the alkoxysilyl group.

11. The condensation-curable silicone composition according to claim 10, wherein Ar in the general formula (1) is a substituted or unsubstituted, phenyl group or pyridyl group.

12. The condensation-curable silicone composition according to claim 11, wherein Ar is a phenyl group, or a phenyl group whose at least one hydrogen atom bonded to the carbon atom is substituted with an alkyl group, a cyclic alkyl group, an alkenyl group, an aryl group, a halogen atom, a nitrogen-containing substituent, an oxygen-containing substituent, a sulfur-containing substituent or a group substituted with a halogen-containing substituent, or a pyridyl group.

13. A cured product obtained from the condensation-curable silicone composition according to claim 1.

14. A method for preparing a cured product, comprising a step of hydrolysis condensate of an organopolysiloxane having an alkoxysilyl group in the presence of a compound represented by the following general formula (1):

(1)

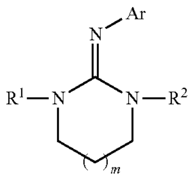

wherein $R^1$ and $R^2$ are, independently of each other, a hydrogen atom or an unsubstituted or substituted, monovalent hydrocarbon group having 1 to 12 carbon atoms, Ar is an unsubstituted or substituted aryl group having 6 to 20 carbon atoms or a heteroaryl group having 3 to 20 carbon atoms, and m is an integer of 0 to 3.

15. The method for preparing the cured product according to claim 14, wherein the organopolysiloxane having an alkoxysilyl group is at least one selected from the cyclic alkoxysiloxane represented by the following general formula (2), a hydrolysis condensate thereof, and a hydrolysis condensate of the cyclic alkoxysiloxane represented by the general formula (2) with an alkoxysilane, (2)

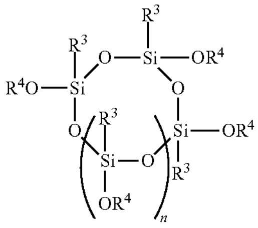

wherein $R^3$ is, independently of each other, an unsubstituted or substituted monovalent hydrocarbon group having 1 to 8 carbon atoms, $R^4$ is, independently of each other, an unsubstituted or substituted monovalent hydrocarbon group having 1 to 3 carbon atoms, and n is an integer of 1 to 3.

16. The method for preparing the cured product according to claim 14, wherein an amount of the compound represented by the general formula (1) is 0.1 to 15, relative to 100 parts by mass of the organopolysiloxane having the alkoxysilyl group.

17. The method for preparing the cured product according to claim 14, wherein Ar in the general formula (1) is a substituted or unsubstituted, phenyl or pyridyl group.

18. The method for preparing the cured product according to claim 17, wherein Ar is a phenyl group whose at least one hydrogen atom bonded to the carbon atom is substituted with an alkyl group, a cyclic alkyl group, an alkenyl group, an aryl group, a halogen atom, a nitrogen-containing substituent, an oxygen-containing substituent, a sulfur-containing substituent or a group substituted with a halogen-containing substituent, or a pyridyl group.

19. A cured product obtained from the condensation-curable silicone composition according to claim 7.

20. A cured product obtained from the condensation-curable silicone composition according to claim 4.

* * * * *